(12) United States Patent
Homburg et al.

(10) Patent No.: US 9,213,466 B2
(45) Date of Patent: Dec. 15, 2015

(54) DISPLAYING RECENTLY USED FUNCTIONS IN CONTEXT SENSITIVE MENU

(75) Inventors: Clemens Homburg, Hamburg (DE); Michael Christoph Haydn, Pinneberg (DE)

(73) Assignee: APPLE INC., Cupertino, CA (US)

( * ) Notice: Subject to any disclaimer, the term of this patent is extended or adjusted under 35 U.S.C. 154(b) by 553 days.

(21) Appl. No.: 12/506,104

(22) Filed: Jul. 20, 2009

(65) Prior Publication Data
US 2011/0016425 A1    Jan. 20, 2011

(51) Int. Cl.
*G06F 3/0482*    (2013.01)

(52) U.S. Cl.
CPC .................................... *G06F 3/0482* (2013.01)

(58) Field of Classification Search
CPC . G06F 3/0482; G06F 9/4446; H04M 1/72583
USPC ........................................................ 715/811
See application file for complete search history.

(56) References Cited

U.S. PATENT DOCUMENTS

| | | | |
|---|---|---|---|
| 5,897,670 A | 4/1999 | Nielsen | |
| 6,232,972 B1 * | 5/2001 | Arcuri et al. | 715/815 |
| 6,493,006 B1 * | 12/2002 | Gourdol et al. | 715/825 |
| 6,583,797 B1 * | 6/2003 | Roth | 715/810 |
| 6,894,662 B2 | 5/2005 | Fukumura | |
| 8,302,004 B2 * | 10/2012 | Chen et al. | 715/702 |
| 2001/0019338 A1 * | 9/2001 | Roth | 345/811 |
| 2001/0037719 A1 * | 11/2001 | Gardner et al. | 84/478 |
| 2002/0175955 A1 * | 11/2002 | Gourdol et al. | 345/821 |
| 2003/0098891 A1 * | 5/2003 | Molander | 345/841 |
| 2004/0021647 A1 * | 2/2004 | Iwema et al. | 345/179 |
| 2005/0204309 A1 * | 9/2005 | Szeto | 715/811 |
| 2006/0218499 A1 * | 9/2006 | Matthews et al. | 715/765 |
| 2008/0005685 A1 * | 1/2008 | Drews et al. | 715/764 |
| 2008/0041220 A1 * | 2/2008 | Foust et al. | 84/625 |
| 2008/0190272 A1 * | 8/2008 | Taub et al. | 84/645 |
| 2009/0007012 A1 * | 1/2009 | Mandic et al. | 715/810 |
| 2010/0175009 A1 * | 7/2010 | Holmes | 715/765 |
| 2010/0251175 A1 * | 9/2010 | Brunkhorst et al. | 715/811 |

* cited by examiner

*Primary Examiner* — Anil Bhargava
(74) *Attorney, Agent, or Firm* — Morgan, Lewis & Bockius LLP

(57) ABSTRACT

A computer implemented method displays an object. The method includes causing the display of a context specific shortcut menu in response to a user command. The menu can include a set of functions relating to the context of the displayed object and a set of a predetermined number of the most recently used functions relating to the context of the displayed object. The most recently used functions can be displayed above the other functions.

22 Claims, 10 Drawing Sheets

DISPLAYING RECENTLY USED FUNCTIONS IN CONTEXT SENSITIVE MENU

FIELD

The following relates to computing devices capable of and methods for displaying menus, and more particularly to displaying a context sensitive shortcut menu related to a displayed object.

BACKGROUND

Computers can display menus related to a displayed object, in response to receiving a command. Displayed objects can include, for example, audio files and MIDI files in a digital audio workstation (DAW), image files in an image editor application, video files in a video editing application, slides in presentation software, and text boxes in a word processing application. These objects can contain related content. For example, an audio file object can contain audio data, a MIDI file object can contain MIDI data, a text box can contain text data, an image object can contain image data, a video object can contain video data etc. In response to a user command, a menu can be displayed, to allow a user to access functions related to an object that is being displayed.

A computer can display an object in more than one context. For example, a DAW can display a MIDI file object in an arrangement context and/or score context. In another example, a computer can display a video file object in an arrangement context and/or a video clip editor context.

As discussed above, a computer can display a menu to allow a user to make changes to a displayed object. In order to effect such changes, a user accesses particular functions and applications to manipulate the object. Ordinarily, a user must cycle through various commands or search through menus to obtain the desired function. As a result, conventional menus can be time consuming and decrease usability.

SUMMARY

As introduced above, users may desire to quickly and easily find and select a desired function with respect to a displayed object. A computer implemented method allows a user to display a context sensitive shortcut menu. The method includes displaying an object and furthermore displaying a menu in response to a user command, wherein the menu includes a set of functions relating to the context of the displayed object and a set of a predetermined number of the most recently used functions relating to the context of the displayed object. The computer can display the most recently used functions at the top of the menu. Additionally, the most recently used functions can be listed chronologically with the most recently used function listed at the top of the menu. Although described in reference to displayed objects within contexts in a DAW, the methods, systems, and computer products described herein can be applied to any objects that can be displayed in multiple contexts.

Many other aspects and examples will become apparent from the following disclosure.

BRIEF DESCRIPTION OF THE DRAWINGS

In order to facilitate a fuller understanding of the exemplary embodiments, reference is now made to the appended drawings. These drawings should not be construed as limiting, but are intended to be exemplary only.

DETAILED DESCRIPTION

The functions described as being performed at various components can be performed at other components, and the various components can be combined and/or separated. Other modifications also can be made.

Thus, the following disclosure ultimately will describe systems, computer readable media, devices, and methods for displaying a context sensitive shortcut menu. Many other examples and other characteristics will become apparent from the following description. Although described in reference to displayed objects within contexts in a DAW, the methods, systems, and computer products described herein can be applied to any objects that can be displayed in multiple contexts such as video objects, image objects, and/or text box objects. A system can present displayed objects in multiple contexts in response to receiving a command.

Figure 1:
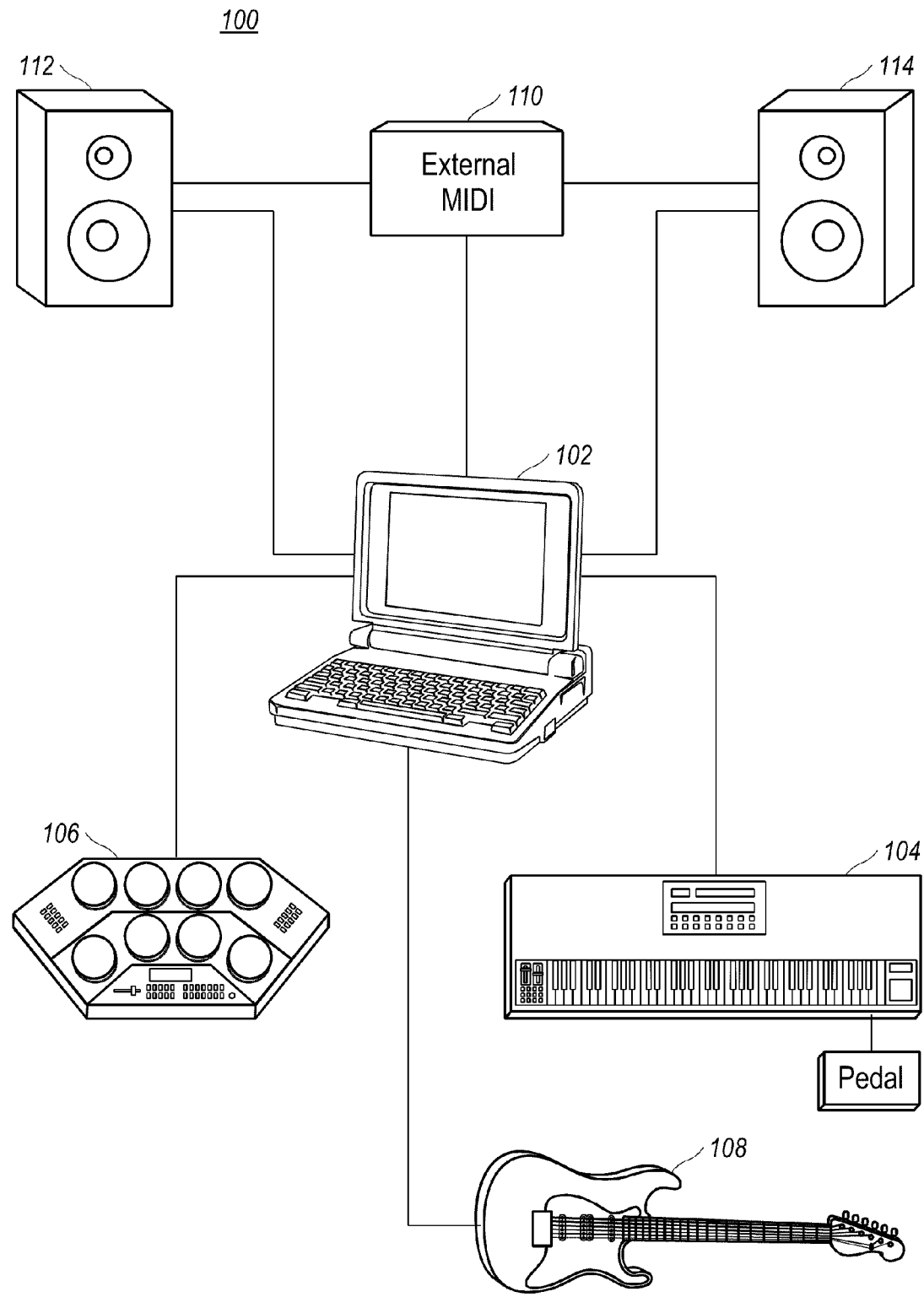
FIG. 1 depicts a block diagram of a system having a DAW musical arrangement in accordance with an exemplary embodiment.

Referring to FIG. 1, a block diagram of a system including a DAW in accordance with an exemplary embodiment is illustrated. As shown, the system 100 can include a computer 102, one or more sound output devices 112, 114, one or more MIDI controllers (e.g. a MIDI keyboard 104 and/or a drum pad MIDI controller 106), one or more instruments (e.g. a guitar 108, and/or a microphone (not shown)), and/or one or more external MIDI devices 110. As would be appreciated by one of ordinary skill in the art, the musical arrangement can include more or less equipment as well as different musical instruments.

The computer 102 can be a data processing system suitable for storing and/or executing program code, e.g., the software to operate the GUI, which together can be referred to as a DAW. The computer 102 can include at least one processor, e.g., a first processor, coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters. In one or more embodiments, the computer 102 can be a desktop computer or a laptop computer.

A MIDI controller is a device capable of generating and sending MIDI data. The MIDI controller can be coupled to and send MIDI data to the computer 102. The MIDI controller can also include various controls, such as slides and knobs, that can be assigned to various functions within the DAW. For example, a knob may be assigned to control the pan on a first track. Also, a slider can be assigned to control the volume on a second track. Various functions within the DAW can be assigned to a MIDI controller in this manner. The MIDI controller can also include a sustain pedal and/or an expression pedal. These can affect how a MIDI instrument plays MIDI data. For example, holding down a sustain pedal while recording MIDI data can cause an elongation of the length of the sound played if a piano software instrument has been selected for that MIDI track.

As shown in FIG. 1, the system 100 can include a MIDI keyboard 104 and/or a drum pad controller 106. The MIDI keyboard 104 can generate MIDI data which can be provided to a device that generates sounds based on the received MIDI data. The drum pad MIDI controller 106 can also generate MIDI data and send this data to a capable device which generates sounds based on the received MIDI data. The MIDI keyboard 104 can include piano style keys, as shown. The drum pad MIDI controller 106 can include rubber pads. The rubber pads can be touch and pressure sensitive. Upon hitting or pressing a rubber pad, or pressing a key, the MIDI controller (104,106) generates and sends MIDI data to the computer 102.

An instrument capable of generating electronic audio signals can be coupled to the computer 102. For example, as shown in FIG. 1, an electrical output of an electric guitar 108 can be coupled to an audio input on the computer 102. Similarly, an acoustic guitar 108 equipped with an electrical output can be coupled to an audio input on the computer 102. In another example, if an acoustic guitar 108 does not have an electrical output, a microphone positioned near the guitar 108 can provide an electrical output that can be coupled with an audio input on the computer 102. The output of the guitar 108 can be coupled to a pre-amplifier (not shown) with the pre-amplifier being coupled to the computer 102. The pre-amplifier can boost the electronic signal output of the guitar 108 to acceptable operating levels for the audio input of computer 102. If the DAW is in a record mode, a user can play the guitar 108 to generate an audio file. Popular effects such as chorus, reverb, and distortion can be applied to this audio file when recording and playing.

The external MIDI device 110 can be coupled to the computer 102. The external MIDI device 110 can include a processor, e.g., a second processor which is external to the first processor 102. The external processor can receive MIDI data from an external MIDI track of a musical arrangement to generate corresponding sounds. A user can utilize such an external MIDI device 110 to expand the quality and/or quantity of available software instruments. For example, a user may configure the external MIDI device 110 to generate electric piano sounds in response to received MIDI data from a corresponding external MIDI track in a musical arrangement from the computer 102.

The computer 102 and/or the external MIDI device 110 can be coupled to one or more sound output devices (e.g., monitors or speakers). For example, as shown in FIG. 1, the computer 102 and the external MIDI device 110 can be coupled to a left monitor 112 and a right monitor 114. In one or more embodiments, an intermediate audio mixer (not shown) may be coupled between the computer 102, or external MIDI device 110, and the sound output devices, e.g., the monitors 112, 114. The intermediate audio mixer can allow a user to adjust the volume of the signals sent to the one or more sound output devices for sound balance control. In other embodiments, one or more devices capable of generating an audio signal can be coupled to the sound output devices 112, 114. For example, a user can couple the output from the guitar 108 to the sound output devices.

The one or more sound output devices can generate sounds corresponding to the one or more audio signals sent to them. The audio signals can be sent to the monitors 112, 114 which can require the use of an amplifier to adjust the audio signals to acceptable levels for sound generation by the monitors 112, 114. The amplifier in this example may be internal or external to the monitors 112, 114.

Although, in this example, a sound card is internal to the computer 102, many circumstances exist where a user can utilize an external sound card (not shown) for sending and receiving audio data to the computer 102. A user can use an external sound card in this manner to expand the number of available inputs and outputs. For example, if a user wishes to record a band live, an external sound card can provide eight (8) or more separate inputs, so that each instrument and vocal can each be recorded onto a separate track in real time. Also, disc jockeys (djs) may wish to utilize an external sound card for multiple outputs so that the dj can cross-fade to different outputs during a performance.

Figure 2:
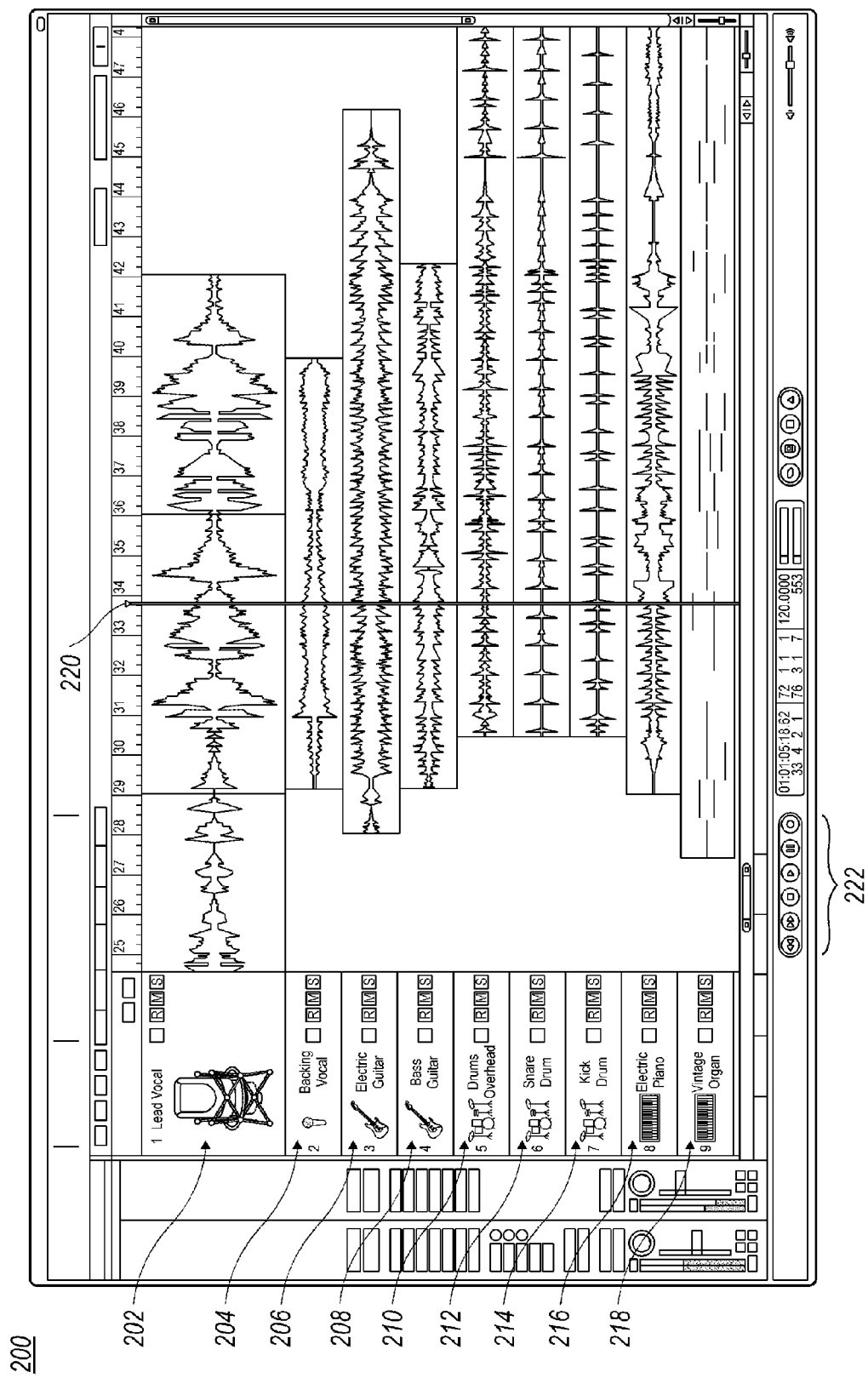
FIG. 2 depicts a screenshot of a GUI of a DAW displaying a musical arrangement context in accordance with an exemplary embodiment.

Referring to FIG. 2, a screenshot of a musical arrangement context in a GUI of a DAW in accordance with an exemplary embodiment is illustrated. The musical arrangement 200 can include one or more tracks with each track having one or more of audio files or MIDI files. Generally, each track can hold audio or MIDI files corresponding to each individual desired instrument. As shown, the tracks are positioned horizontally. A playhead 220 moves from left to right as the musical arrangement is recorded or played. As one of ordinary skill in the art would appreciate, other tracks and playhead 220 can be displayed and/or moved in different manners. The playhead 220 moves along a timeline that shows the position of the playhead within the musical arrangement. The timeline indicates bars, which can be in beat increments. For example as shown, a four (4) beat increment in a 4/4 time signature is displayed on a timeline with the playhead 220 positioned between the thirty-third (33rd) and thirty-fourth (34th) bar of this musical arrangement. A transport bar 222 can be displayed and can include commands for playing, stopping, pausing, rewinding and fast-forwarding the displayed musical arrangement. For example, radio buttons can be used for each command. If a user were to select the play button on transport bar 222, the playhead 220 would begin to move down the timeline, e.g., in a left to right fashion.

As shown, the lead vocal track, 202, is an audio track. One or more audio files corresponding to a lead vocal part of the musical arrangement can be located on this track. In this example, a user has directly recorded audio into the DAW on the lead vocal track. The backing vocal track, 204 is also an audio track. The backing vocal 204 can contain one or more audio files having backing vocals in this musical arrangement. The electric guitar track 206 can contain one or more electric guitar audio files. The bass guitar track 208 can contain one or more bass guitar audio files within the musical arrangement. The drum kit overhead track 210, snare track 212, and kick track 214 relate to a drum kit recording. An overhead microphone can record the cymbals, hit-hat, cow bell, and any other equipment of the drum kit on the drum kit overhead track. The snare track 212 can contain one or more audio files of recorded snare hits for the musical arrangement. Similarly, the kick track 214 can contain one or more audio files of recorded bass kick hits for the musical arrangement. The electric piano track 216 can contain one or more audio files of a recorded electric piano for the musical arrangement.

The vintage organ track 218 is a MIDI track. Those of ordinary skill in the art will appreciate that the contents of the files in the vintage organ track 218 can be shown differently because the track contains MIDI data and not audio data. In this example, the user has selected an internal software instrument, a vintage organ, to output sounds corresponding to the MIDI data contained within this track 218. A user can change the software instrument, for example to a trumpet, without changing any of the MIDI data in track 218. Upon playing the musical arrangement the trumpet sounds would now be played corresponding to the MIDI data of track 218. Also, a user can set up track 218 to send its MIDI data to an external MIDI instrument, as described above.

Each of the displayed audio and MIDI files in the musical arrangement as shown on screen 200 can be altered using the GUI. For example, a user can cut, copy, paste, or move an audio file or MIDI file on a track so that it plays at a different position in the musical arrangement. Additionally, a user can loop an audio file or MIDI file so that it is repeated, split an audio file or MIDI file at a given position, and/or individually time stretch an audio file for tempo.

Figure 3:
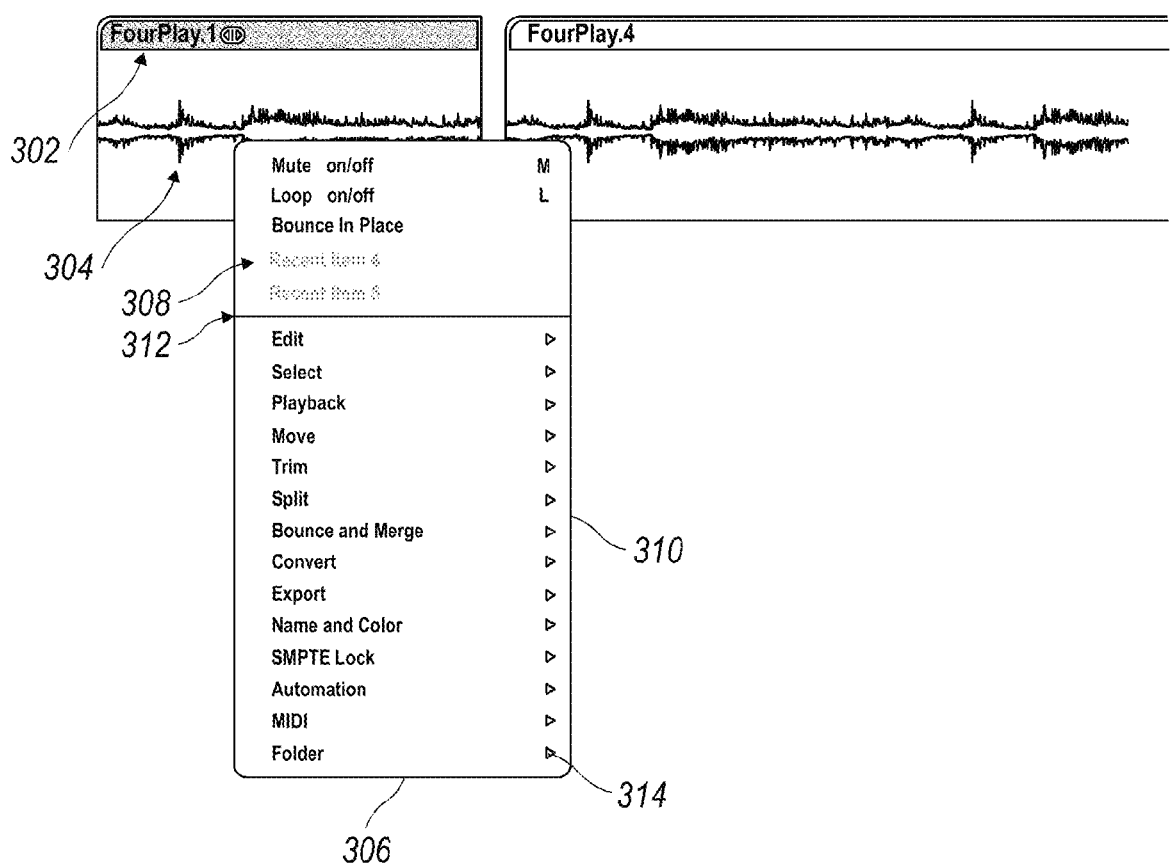
FIG. 3 depicts a screenshot of a GUI displaying a context sensitive shortcut menu in a musical arrangement context in accordance with an exemplary embodiment.

Referring to FIG. 3, a screenshot 300 of a GUI displaying a context sensitive shortcut menu in a musical arrangement context in accordance with an exemplary embodiment is illustrated. The musical arrangement 302 is displayed in a musical arrangement context similar to the context of FIG. 2. Displayed objects are presented in a context and a context sensitive shortcut menu related to displayed objects is shown. The musical arrangement 302 further has an audio file object 304 labeled in this case as FourPlay.1. Another audio file object is labeled as FourPlay.4. Further depicted is a context sensitive shortcut menu or shortcut menu 306 divided into a recent function portion 308 and a submenu portion 310. For example, in FIG. 3, the recent function portion 308 is shown in the upper portion of the shortcut menu 306 and the submenu portion 310 is shown in the lower part of the shortcut menu 306. The recent function portion 308 and submenu portion 310 are divided by a horizontal line 312 setting the boundary between the two portions 308, 310 of the shortcut menu 306. It will be understood that the division and arrangement between the recent function portion 308 and the submenu portion 310 in the shortcut menu 306 may take other forms as well.

The shortcut menu 306 may be brought up in response to a command from a user, such as a "right click" on a mouse, or a "left click" on a mouse while pressing a button on the keyboard such as a "ctrl" key. For example, a user can bring up the shortcut menu 306 by holding the "ctrl" key or right button on a mouse while pointing to an object on the GUI. It will be understood by those of skill in the art that other user commands may be utilized for displaying the shortcut menu 306. Additionally, in one or more embodiments, a "right click" on a mouse by a user can optionally display both the shortcut menu and a tool menu combined into one menu.

The recent function portion 308 can have a listing of the most recently used functions. The functions in the recent function portion 308 can be context based (related to the context of the displayed objects). The listing can include a predetermined number of those functions that the user has most recently selected. The listing can include selected functions from the functions listed under submenus of the submenu portion 310. The submenu portion 310 can be context based. As shown in FIG. 3, a submenu can include an associated black triangle 314 to access functions related to its submenu.

The recent function portion 308 can list the most recent selected functions in the top of the shortcut menu 306 to allow a user to easily access such functions for re-use. Such an arrangement enhances usability of the object-based program capable of displaying objects in more than one context, e.g., the DAW, because a user can use certain functions more often than other functions. Therefore, providing recently used functions in the top portion of the shortcut menu 306 allows the user to avoid the tedium and time consuming process of searching through menus or cycling functions for a given context.

The most recently used function can be listed at the top of the recent function portion 308, with each succeeding recently used function listed below it. Accordingly, in the embodiment shown in FIG. 3, the most recently used function is listed at the very top of the menu, and the oldest recently used function is listed beneath the other functions at the bottom of the recent function portion 308 of the shortcut menu 306. The recent function portion 308 can list the most recently used functions related to the context menu. The context menu is related to the context of the displayed objects. The screenshot illustrates audio file objects in the musical arrangement context. The musical arrangement context can also contain other objects, such as MIDI file objects. A context sensitive shortcut menu, e.g. an arrangement context menu, is displayed. In one or more embodiments, the recent function portion 308 can list the most recently used functions regardless of the window. Furthermore, in FIG. 3, five (5) of the most recently used functions are shown. It would be understood that there may be employed other numbers of recently used functions, e.g., five (5), ten (10), fifteen (15), or twenty (20). As shown in FIG. 3, the additional submenu 314 can include a listing in chronological order from top to bottom as follows: "Edit", "Select", "Playback", "Move", "Trim", "Split", "Bounce and Merge", "Convert", "Export", "Name and Color", "SMPTE Lock", "Automation", "MIDI", and "Folder." The additional submenus 314 which are shown in the submenu portion 310 of the short cut menu 306 are context specific, and therefore the particular set of submenus and/or functions shown in the shortcut menu 306 depend on the context of the displayed object. Therefore, in contexts other than that shown in FIG. 3, there may be displayed a different set of submenus and/or functions. Moreover, the number of submenus and/or functions shown may be varied, for example, while fourteen (14) submenus are shown in FIG.

4, there may be five (5), ten (10), fifteen (15), or twenty (20) submenus shown in the submenu portion 310 of the shortcut menu 306.

In addition, one or more functions of the recent function portion 308 can include an indicator indicating that the function is not accessible. For example, the bottom two functions listed in the recent function portion 308 are lighter in color than the top three listed functions. The lighter, or dimmed, color is an indication that although potentially having use in this particular context, the particular functions are not useable for that particular object at that time. The recently used functions 308 may also have an associated shortcut key allowing a user to merely push a particular key on the keyboard to choose the function. As shown in FIG. 3, the top two most recently used functions have "M" and "L," respectively, as shortcut keys for those particular functions.

Figure 4:
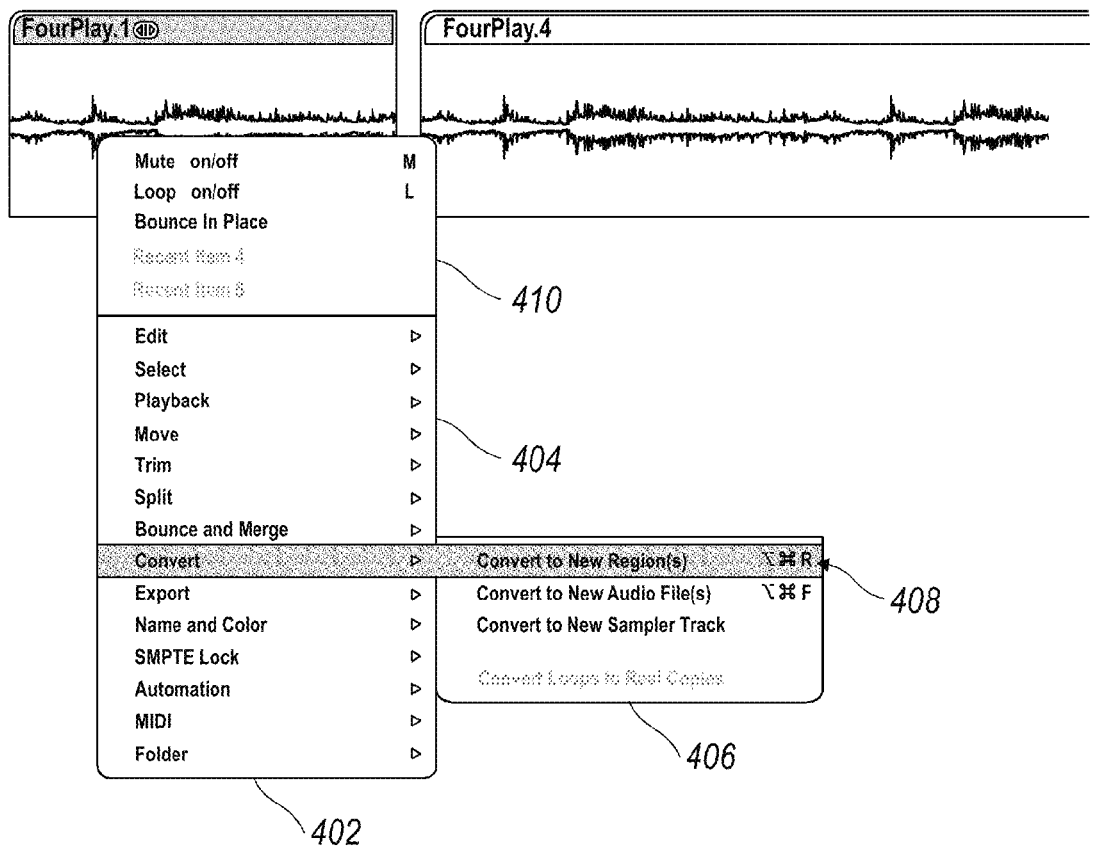
FIG. 4 depicts a screenshot of a GUI displaying a context sensitive shortcut menu in a musical arrangement context in which a function is selected in accordance with an exemplary embodiment.

Referring to FIGS. 4-8, a series of screenshots (400, 500, 600, 700, 800) displaying a context sensitive shortcut menu, including recent functions, in a musical arrangement context in accordance with an exemplary embodiment are illustrated. As shown in FIG. 4, audio file objects are displayed in the GUI in a musical arrangement context. A context sensitive shortcut menu or shortcut menu 402 with the "Convert" submenu 406 is selected. With the selection of the "Convert" submenu 406, three functions are displayed "Convert to New Region(s)," "Convert to New Audio File(s)", and "Convert to New Sampler Track." There is an additional function entitled "Convert Loops to Real Copies" which is listed but is shown in a lighter color, or dimmed, in the menu than the other three functions listed in the submenu illustrating that this function is not accessible. As can be seen these options relate to manipulating or interacting in the musical arrangement context. After the selection of the function "Convert to New Region(s)," 408 in the submenu portion 404 of the shortcut menu 402, this function becomes the most recently selected function and would be displayed at the top of the list of functions in the recent function portion 410 of the shortcut menu 402.

Figure 5:
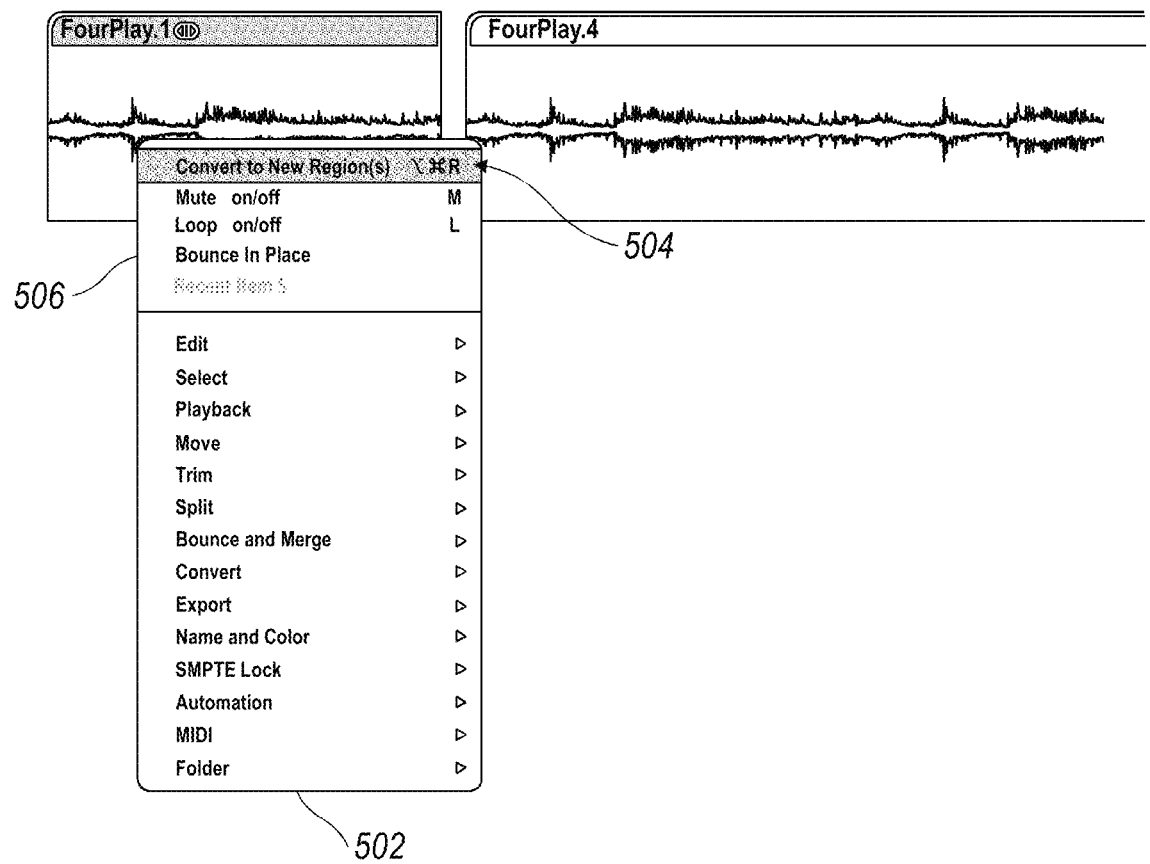
FIG. 5 depicts a screenshot of a GUI displaying a context sensitive shortcut menu in a musical arrangement context in which a selected function was added to a most recently used functions list in accordance with an exemplary embodiment.

Referring to FIG. 5, the function "Convert to New Region(s)" 504 is now listed chronologically at the top of the context sensitive shortcut menu or shortcut menu 502 as a result of the user's selection shown in FIG. 4. More specifically, the function "Convert to New Region(s)" 504 is listed at the top of the recent function portion 506 of the shortcut menu 502. Moreover, as shown in the illustrated embodiment, the set of most recently used functions is limited to only five (5) functions. Accordingly, the previous most recently used functions shown in FIG. 4, have been moved further down the list with the previous lowest most used function (or oldest most recently used function) being removed from the set to make way for the newest function. As depicted in FIG. 5, the user may open the shortcut menu 502, and easily re-select the "Convert to New Region(s)" function 504. The arrangement of this function at the top of the shortcut menu 502 after having been recently used increases the usability of the DAW and improves the overall experience for a user.

Figure 6:
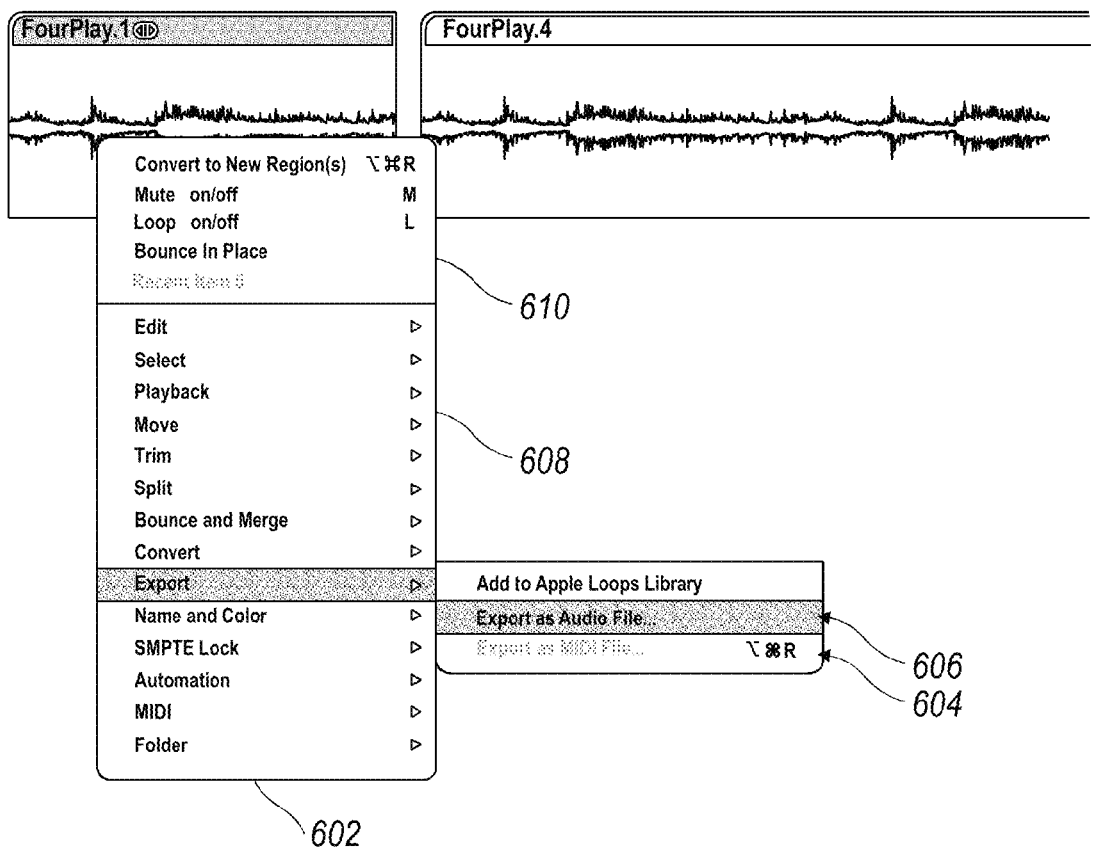
FIG. 6 depicts a screenshot of a GUI displaying a context sensitive shortcut menu in a musical arrangement context in which a function is selected in accordance with an exemplary embodiment.

Referring to FIG. 6, the user may make an additional selection from the submenus 602. In the embodiment in FIG. 6, the submenu "Export" has been accessed thereby opening a list of functions including "Add to Apple Loops Library . . ." and "Export as Audio File . . ." An additional function "Export as MIDI File" 604 can be dimmed because it is not selectable by the user as it is not useable for this particular region. As can be seen, these options relate to manipulating or interacting in the musical arrangement context. After selection of the function "Export as Audio File . . ." 606 in the submenu portion 608 of the context sensitive shortcut menu or shortcut menu 602, this function now will be listed in the recent function portion 610 of the shortcut menu 602 as one of the most recently used functions.

Figure 7:
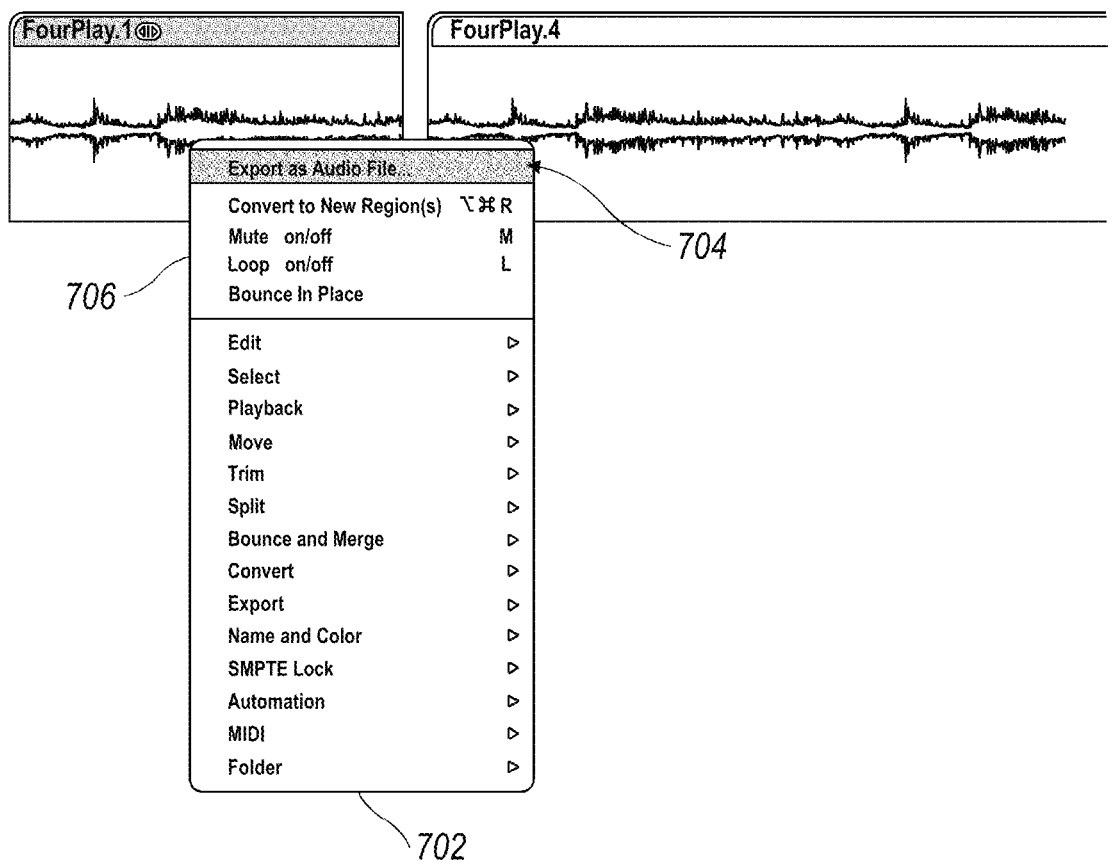
FIG. 7 depicts a screenshot of a GUI displaying a context sensitive shortcut menu in a musical arrangement context in which a selected function was added to a most recently used functions list in accordance with an exemplary embodiment.

Referring now to FIG. 7, as a result of the selection in FIG. 6, the function "Export as Audio File . . ." 704 is now listed chronologically at the top of the recent items menu 706 of the shortcut menu 702. Furthermore, as can be seen, the previous recently used most recent functions are listed below the "Export as Audio File . . ." function including the function "Convert to New Region(s)," which was selected as illustrated in FIG. 4. Moreover, as shown in the illustrated embodiment, the set of most recently used functions is limited to only five functions. Accordingly, the previous most recently used functions shown in FIG. 4, have been moved further down the list with the previous lowest most used function (or oldest most recently used function) being removed from the set to make way for the newest function. Now, as can be seen in FIG. 7, the function "Bounce in Place" is now at the bottom of the recent function portion 706, as it is the oldest of the recently used functions.

As depicted in FIG. 7, the user may open the context sensitive shortcut menu or shortcut menu 702, and easily re-select the "Export as Audio File . . ." function. The arrangement of this function at the top of the shortcut menu 702 after having been recently used increases the usability of the DAW and improves the overall experience for a user.

Figure 8:
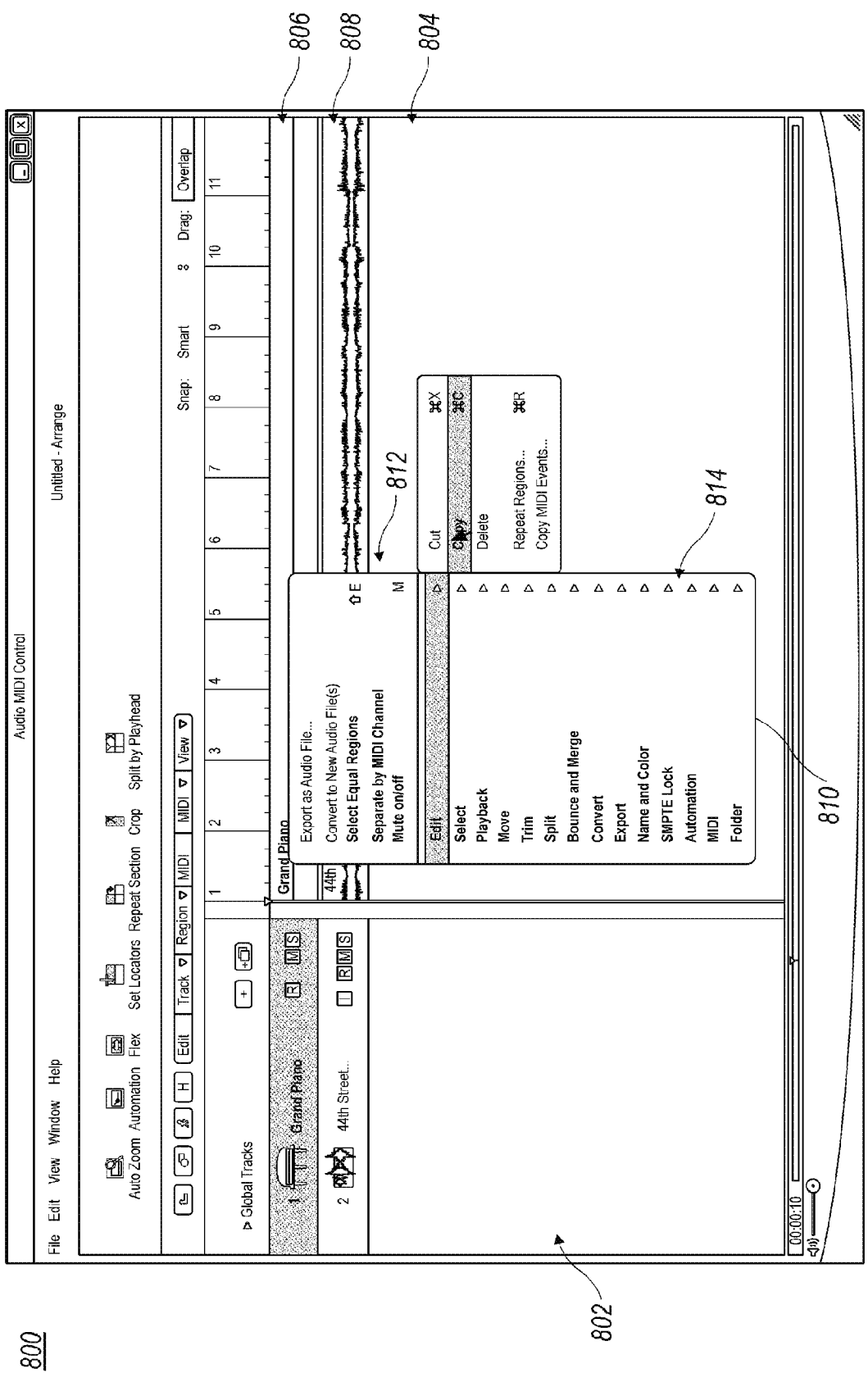
FIG. 8 depicts a screenshot of a GUI displaying a context sensitive shortcut menu in a musical arrangement context in which a function is selected in accordance with an exemplary embodiment.

Referring to FIG. 8, a screenshot of a GUI of a DAW displaying a context sensitive shortcut menu in which a function is selected in a musical arrangement context in accordance with an exemplary embodiment is illustrated. A GUI having a musical arrangement context is shown. In the musical arrangement context is a musical arrangement containing both a MIDI track and an audio track. On the left division 802 of the screenshot are the labels for the tracks, and on the right division 804 are shown the wave files and MIDI data for the tracks. As shown therein is a Grand Piano MIDI track 806 and an audio track 808. As shown, a context sensitive shortcut menu or shortcut menu 810 can be brought up in response to a command from a user, such as a "right click" on a mouse, or a "left click" on a mouse while pressing a button on the keyboard such as a "ctrl" key when pointing to a particular object, in this case the grand piano MIDI track. It will be understood by those of ordinary skill in the art that other user commands may be utilized for displaying the shortcut menu 810.

The recent function portion 812 in the upper portion of the shortcut menu 810 has a listing of the most recently used functions. The most recently used functions are listed chronologically from the top as "Export as Audio File . . . ," "Convert to New Audio File(s)", "Select Equal Regions," "Separate by MIDI Channel," and "Mute on/off." Even if a new session has started, these functions can be carried over from the previous session for a particular user and/or for a particular context. Those of ordinary skill in the art would appreciate that a DAW can allow multiple user logins and store data for each user profile, including most recent selected context specific functions. Accordingly, if a user has made several functions which have been added to the top of the shortcut menu 810 in a previous session, if a new session is started, these same recently used functions can still be listed at the top of the shortcut menu 810 for the same context.

In the submenu portion 814 of the shortcut menu 810, the user may make a selection from among the submenus. In this musical arrangement context, the submenu portion 814 includes a listing in chronological order from top to bottom: "Edit", "Select", "Playback", "Move", "Trim", "Split", "Bounce and Merge", "Convert", "Export", "Name and Color", "SMPTE Lock", "Automation", "MIDI", and "Folder." As shown the submenu "Edit" has been selected, thereby opening a list of functions including "Cut," "Copy," "Delete," "Repeat Regions . . . ," and "Copy MIDI Events . . . " These options relate to editing, e.g., manipulating or interacting with the musical arrangement. After selection of the function "Copy" in the submenu portion 814 of the shortcut menu 810, this function will be listed in the recent function portion 812 of the shortcut menu 810 as one of the most recently used functions the next time the shortcut menu 810 is displayed.

Figure 9:
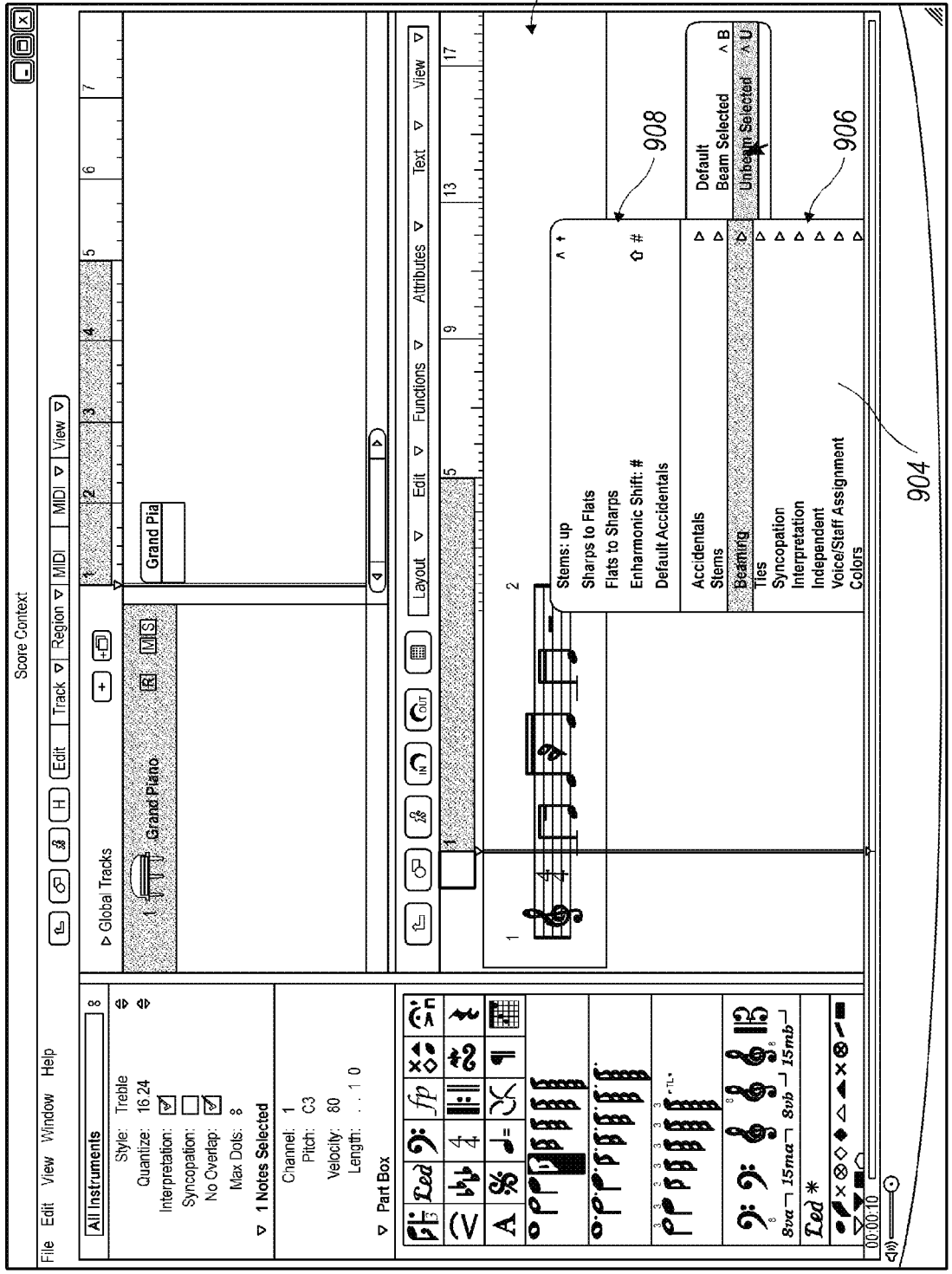
FIG. 9 depicts a screenshot of a GUI displaying a context sensitive shortcut menu in a score context in which a selected function was added to a most recently used functions list in accordance with an exemplary embodiment.

Referring to FIG. 9, a screenshot of a musical arrangement in a GUI of a DAW for a score context menu in accordance with an embodiment is illustrated. A GUI having a context window 900 of a musical arrangement containing a score 902 is shown. The score context window 900 enables a user to build a musical score by selecting various musical notes, signatures, and other functions shown on the left side of the context window 900. When selected, this score data can be placed in the musical score. The content in the score context 902 is related to a MIDI file object as shown.

As shown, a context sensitive shortcut menu or shortcut menu 904 may be brought up in response to a command from a user, such as a "right click" on a mouse, or a "left click" on a mouse while pressing a button on the keyboard such as a "ctrl" key and pointing to a particular region in the GUI. It will be understood by those of ordinary skill in the art that other user commands may be utilized for displaying the shortcut menu 904.

In the submenu portion 906 of the shortcut menu 904, the user may make a selection from among the submenus. The listing of submenus and/or functions listed in the shortcut menu 904 is different than those listed in the shortcut menus displayed in FIGS. 4-8 due to the difference in context. The submenus and/or functions shown in FIGS. 4-8 are for a musical arrangement context while the submenus and/or functions shown in FIG. 9 are those for a musical score context. In this score context, the submenus include a listing in chronological order from top to bottom: "Accidentals", "Stems," "Beaming," "Ties," "Syncopation," "Interpretation," "Independent," "Voice/Staff Assignment," and "Colors." These options relate to manipulating or interacting with the musical score. Objects, such as a MIDI file, can be displayed in more than one context. For example a MIDI file object can be displayed in a musical arrangement context and a score context.

The recent function portion 908 in the upper portion of the shortcut menu 904 has a listing of the most recently used functions. As shown, the most recently used functions are listed chronologically from the top as "Stems: up" "Sharps to Flats," "Flats to Sharps," "Enharmonic Shift," and "Default Accidentals." Even if a new session has started these functions can be carried over from the previous session for a particular user and for this musical score context menu. Accordingly, if a user has selected several functions which have been added to the top of the shortcut menu in a previous session, if a new session is started, these same recently used functions can still be listed at the top of the shortcut menu for this same context.

Figure 10:
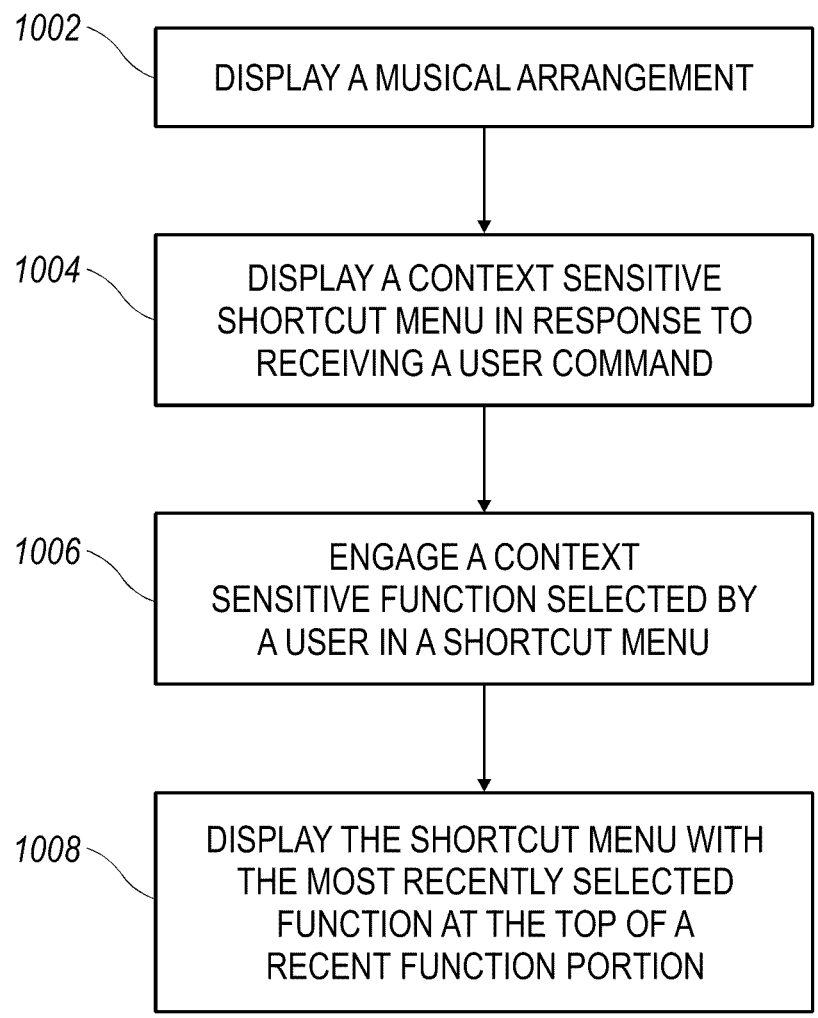
FIG. 10 illustrates a flow chart of a method for displaying most recently used functions in a context sensitive shortcut menu in accordance with an exemplary embodiment.

Referring to FIG. 10, a flow chart of a method for displaying recently used functions in a context sensitive menu with an exemplary embodiment is illustrated. The exemplary method 1000 is provided by way of example, as there are a variety of ways to carry out the method. In one or more embodiments, the method 1000 is performed by the computer 102 of FIG. 1. The method 1000 can be executed or otherwise performed by one or a combination of various systems. The method 1000 described below can be carried out using the devices illustrated in FIG. 1 by way of example, and various elements of this figure are referenced in explaining exemplary method 1000. Each block shown in FIG. 1000 represents one or more processes, methods or subroutines carried out in exemplary method 1000. The exemplary method 1000 can begin at block 1002. Although described in reference to displayed objects within contexts in a DAW, the method described in FIG. 10 can be applied to any objects that can be displayed in multiple contexts.

At block 1002, a window associated with an object, e.g., a musical arrangement, is displayed on a GUI. For example, the computer 102, e.g., a first processor or processor module, causes the display of a window associated with a musical arrangement. The musical arrangement can contain, for example, MIDI tracks, audio tracks, or a musical score and combinations thereof. In another example, a display module can display the MIDI track, audio track, and/or a musical score. After displaying the window containing the musical arrangement, the method 1000 can proceed to block 1004.

At block 1004, a context sensitive shortcut menu can be displayed in response to a user command. The context sensitive shortcut menu can include two portions: a submenu portion and a recent function portion. The submenu portion can include a list of functions related to the context of the window. The recent function portion can include a list of a predetermined number of the most recently used functions related to the context of the window. For example, by clicking the right mouse key or by clicking the left mouse key while holding down the "ctrl," key while pointing to a particular object on the GUI, the processor or menu display module can cause the display of the content sensitive shortcut menu. The contents of the shortcut menu depend on the context of the displayed window. For example, the submenus and functions displayed in the shortcut menu in a musical arrangement context may be different than the submenus and functions displayed in a musical score context. The processor or processor module of the computer 102 can store, maintain, and/or retrieve data from a recent function list associated with a context menu. This data can be stored as an array in memory. The list can include, in chronological order, the most recently used functions associated with the context menu. A context menu can appear in more than one context window, if appropriate. Additionally, a context can display more than one context menu depending on where a user clicks to open a context menu. For example, in a score context, right clicking on a note in a tablature staff can open a different context menu than right clicking on a note in a normal staff. The recent function list can be stored, for example, in a memory and/or a hard drive of computer 102. Similarly to the displayed recent function portion, the recent function list can be limited to a predetermined number of items, e.g., equal to the predetermined number of functions listed in the recent function portion with the most recently used function replacing the least recently used function in the list. The predetermined number of recently chosen functions may be displayed at the top of the shortcut menu. For example, the last five functions used may be displayed at the top of the shortcut menu, with the most recent listed at the very top. The user may have the option of adjusting the number of displayed functions. Additionally, the user may be able to remove one or more of the recently used functions. Furthermore, if the program or method is terminated by closing the program or shutting down the computer, upon opening the program again, the same recently used functions can be displayed for that particular user for the same contexts in which they had been used.

At block 1006, a context specific function is engaged in response to a command selected by a user in the context sensitive shortcut menu. The function can be engaged, for example, by selecting a function from the recent function portion, or by selecting a function presented in a submenu. The method can also include storing this selected context specific function in a list. The list can have a predetermined size.

At block 1008, a revised context sensitive shortcut menu is displayed in response to a command. The revised shortcut menu can include a revised or most recently updated recent function portion for the context menu, e.g., with the most recently used function added to the list and replacing the oldest recently used function. For example, in response to the user pulling up the shortcut menu, the most recently used function is now displayed at the top of the shortcut menu. The processor or processor module can display the revised list based on the recent function list associated with the context menu.

The above disclosure provides examples and aspects relating to various embodiments within the scope of claims, appended hereto or later added in accordance with applicable law. However, these examples are not limiting as to how any disclosed aspect may be implemented, as those of ordinary skill can apply these disclosures to particular situations in a variety of ways.

We claim:

1. A computer-implemented method, comprising:
   displaying a user interface for a first application, the first application including a displayed object;
   storing information identifying a first set of recently-used sub-functions that were recently used while interacting with the first application in a first context associated with a first object, and a second set of recently-used sub-functions that were recently used while interacting with the first application in a second context associated with a second object, wherein the first set of recently used sub-functions and the second set of recently used sub-functions carry over between sessions for a respective user; and
   while displaying the user interface for the first application:
   receiving a request, specific to the displayed object, to display a contextual menu associated with the displayed object in the first application;
   in response to receiving the request to display the contextual menu associated with the displayed object, displaying a context sensitive shortcut menu specifically associated with the displayed object, the context sensitive shortcut menu including a recent function portion and a submenu portion, wherein the submenu portion includes functions relating to the context of the displayed object in the first application, including at least one function having one or more sub-functions;
   in accordance with a determination that the displayed object is a first object, the context sensitive shortcut menu includes, in the recent function portion, the first set of recently-used sub-functions that were recently used while interacting with the first application in the first context associated with the first object; and
   in accordance with a determination that the displayed object is a second object that is different from the first object, the context sensitive shortcut menu includes, in the recent function portion, the second set of recently-used sub-functions that were recently used while interacting with the first application in the second context associated with the second object, wherein the second set of recently-used sub-functions is different from the first set of recently-used sub-functions and the first context is different from the second context.

2. The method of claim 1, further comprising:
   receiving input corresponding to a command associated with a new object; and
   displaying a new context sensitive shortcut menu associated with the new object, wherein the new context sensitive shortcut menu includes one or more new functions relating to a context of the new object, and wherein the new context sensitive shortcut menu is different than the context sensitive shortcut menu.

3. The method of claim 1, further comprising:
   selecting a sub-function of the one or more sub-functions; and
   adding the selected sub-function to the recent function portion of the context sensitive shortcut menu.

4. The method of claim 3, wherein the recent function portion of the context sensitive shortcut menu includes a predetermined number of recently used sub-functions and the predetermined number of recently used sub-functions are listed chronologically with the selected sub-function being listed first.

5. The method of claim 4, further comprising:
   storing the predetermined number of recently used sub-functions in memory, wherein the stored predetermined number of recently used sub-functions are displayed in the recent function portion of the context sensitive shortcut menu.

6. The method of claim 4, wherein the predetermined number of recently used sub-functions is user-adjustable.

7. The computer-implemented method of claim 1, wherein the displayed object includes editable content.

8. The computer-implemented method of claim 1, wherein the displayed object is a representation of an audio file.

9. A computer-implemented system, comprising:
   one or more data processors; and
   one or more non-transitory computer-readable storage media containing instructions configured to cause the one or more processors to perform operations including:
   displaying a user interface for a first application, the first application including a displayed object;
   storing information identifying a first set of recently-used sub-functions that were recently used while interacting with the first application in a first context associated with a first object, and a second set of recently-used sub-functions that were recently used while interacting with the first application in a second context associated with a second object, wherein the first set of recently used sub-functions and the second set of recently used sub-functions carry over between sessions for a respective user; and
   while displaying the user interface for the first application:
   receiving a request, specific to the displayed object, to display a contextual menu associated with the displayed object in the first application;
   in response to receiving the request to display the contextual menu associated with the displayed object, displaying a context sensitive shortcut menu specifically associated with the displayed object, the context sensitive shortcut menu including a recent function portion and a submenu portion, wherein the submenu portion includes functions relating to the context of the displayed object in the first application, including at least one function having one or more sub-functions;

in accordance with a determination that the displayed object is a first object, the context sensitive shortcut menu includes, in the recent function portion, the first set of recently-used sub-functions that were recently used while interacting with the first application in the first context associated with the first object; and in accordance with a determination that the displayed object is a second object that is different from the first object, the context sensitive shortcut menu includes, in the recent function portion, the second set of recently-used sub-functions that were recently used while interacting with the first application in the second context associated with the second object, wherein the second set of recently-used sub-functions is different from the first set of recently-used sub-functions and the first context is different from the second context.

10. The system of claim 9, further comprising instructions configured to cause the one or more processors to perform operations including:

receiving input corresponding to a command associated with a new object; and displaying a new context sensitive shortcut menu associated with the new object, wherein the new context sensitive shortcut menu includes one or more new functions relating to a context of the new object, and wherein the new context sensitive shortcut menu is different than the context sensitive shortcut menu.

11. The system of claim 9, further comprising instructions configured to cause the one or more processors to perform operations including:

selecting a sub-function of the one or more sub-functions; and adding the selected sub-function to the recent function portion of the context sensitive shortcut menu.

12. The system of claim 11, wherein the recent function portion of the context sensitive shortcut menu includes a predetermined number of recently used sub-functions and the predetermined number of recently used sub-functions are listed chronologically with the selected sub-function being listed first.

13. The system of claim 12, further comprising instructions configured to cause the one or more processors to perform operations including:

storing the predetermined number of recently used sub-functions in memory, wherein the stored predetermined number of recently used sub-functions are displayed in the recent function portion of the context sensitive shortcut menu.

14. The system of claim 12, wherein the predetermined number of recently used sub-functions is user-adjustable.

15. The system of claim 9, wherein the displayed object includes editable content.

16. A non-transitory computer readable storage medium storing instructions that when executed by a data processing apparatus cause the data processing apparatus to:

display a user interface for a first application, the first application including a displayed object;

storing information identifying a first set of recently-used sub-functions that were recently used while interacting with the first application in a first context associated with a first object, and a second set of recently-used sub-functions that were recently used while interacting with the first application in a second context associated with a second object, wherein the first set of recently used sub-functions and the second set of recently used sub-functions carry over between sessions for a respective user; and while displaying the user interface for the first application:

receive a request, specific to the displayed object, to display a contextual menu associated with the displayed object in the first application;

in response to receiving the request to display the contextual menu associated with the displayed object, display a context sensitive shortcut menu specifically associated with the displayed object, the context sensitive shortcut menu including a recent function portion and a submenu portion, wherein the submenu portion includes functions relating to the context of the displayed object in the first application, including at least one function having one or more sub-functions;

in accordance with a determination that the displayed object is a first object, the context sensitive shortcut menu includes, in the recent function portion, the first set of recently-used sub-functions that were recently used while interacting with the first application in the first context associated with the first object; and in accordance with a determination that the displayed object is a second object that is different from the first object, the context sensitive shortcut menu includes, in the recent function portion, the second set of recently-used sub-functions that were recently used while interacting with the first application in the second context associated with the second object, wherein the second set of recently-used sub-functions is different from the first set of recently-used sub-functions and the first context is different from the second context.

17. The non-transitory computer readable storage medium of claim 16, further comprising instructions configured to cause the data processing apparatus to:

receive input corresponding to a command associated with a new object; and display a new context sensitive shortcut menu associated with the new object, wherein the new context sensitive shortcut menu includes one or more functions relating to a context of the new object, and wherein the new context sensitive shortcut menu is different than the context sensitive shortcut menu.

18. The non-transitory computer readable storage medium of claim 16, further comprising instructions configured to cause the data processing apparatus to:

select a sub-function of the one or more sub-functions; and add the selected sub-function to the recent function portion of the context sensitive shortcut menu.

19. The non-transitory computer readable storage medium of claim 18, wherein the recent function portion of the context sensitive shortcut menu includes a predetermined number of recently used sub-functions and the predetermined number of recently used sub-functions are listed chronologically, with the selected sub-function being listed first.

20. The non-transitory computer readable storage medium of claim 19, further comprising instructions configured to cause the data processing apparatus to:

store the predetermined number of recently used sub-functions in memory, wherein the stored predetermined number of recently used sub-functions are displayed in the recent function portion of the context sensitive shortcut menu.

21. The non-transitory computer readable storage medium of claim 19, wherein the predetermined number of recently used sub-functions is user-adjustable.

22. The non-transitory computer readable storage medium of claim 16, wherein the displayed object includes editable content.

* * * * *